United States Patent [19]

Komura et al.

[11] Patent Number: 5,356,347

[45] Date of Patent: Oct. 18, 1994

[54] HYDROSTATIC CONTINUOUSLY VARIABLE TRANSMISSION

[75] Inventors: Norio Komura; Hiroshige Makita, both of Tokyo; Tomoaki Ishikawa, Saitama; Taro Miyakawa, Tokyo, all of Japan

[73] Assignee: Honda Giken Kokyo Kabushiki Kaisha, Tokyo, Japan

[21] Appl. No.: 987,752

[22] Filed: Dec. 9, 1992

[30] Foreign Application Priority Data

Oct. 23, 1992 [JP] Japan .................................. 4-309680

[51] Int. Cl.⁵ .............................................. F16H 59/00
[52] U.S. Cl. ................................................ 474/28; 474/18
[58] Field of Search .................. 474/8, 11, 12, 17, 18, 474/28, 69, 70; 74/730.1, 606 R, 867–869

[56] References Cited

U.S. PATENT DOCUMENTS

| | | | |
|---|---|---|---|
| 4,704,097 | 11/1987 | Sakai | 474/28 |
| 4,765,228 | 8/1988 | Wagenseil | |
| 4,942,786 | 7/1990 | Dittrich | 474/28 X |
| 4,973,288 | 11/1990 | Sakakibara et al. | 474/28 X |
| 5,125,291 | 6/1992 | Makita et al. | |

FOREIGN PATENT DOCUMENTS 62-253967  5/1987  Japan .

*Primary Examiner*—Thuy M. Bui
*Attorney, Agent, or Firm*—Howard L. Rose

[57] ABSTRACT

A hydrostatic continuously variable transmission includes a closed hydraulic circuit comprising a hydraulic pump, a hydraulic motor, and an oil supply passage connected between the hydraulic pump and the hydraulic motor. The hydraulic pump selectively generates a first oil pressure lower than a first predetermined pressure level, a second slowly-changing oil pressure higher than the first predetermined pressure level when the transmission is in normal operation, and a third rapidly-changing oil pressure higher than a second predetermined pressure level higher than the first predetermined pressure level when the transmission starts to operate. The transmission also includes a first pressure-responsive valve for connecting the oil supply passage to the oil tank in response to the first oil pressure applied through the oil supply passage, and disconnecting the oil supply passage from the oil tank in response to the second oil pressure applied through the oil supply passage, and a second pressure-responsive valve for connecting the oil supply passage to the oil tank in response to the third oil pressure applied through the oil supply passage, and disconnecting the oil supply passage from the oil tank in response to the second oil pressure applied through the oil supply passage.

47 Claims, 11 Drawing Sheets 5,356,347

HYDROSTATIC CONTINUOUSLY VARIABLE TRANSMISSION

BACKGROUND OF THE INVENTION

1. Field of the Invention:

The present invention relates to a hydrostatic continuously variable transmission for transmitting drive power from a power source, such as an engine, to drive wheels of a working vehicle, for example.

2. Description of the Relevant Art:

Some working vehicles such as riding-type lawn mowers, tractors, etc. employ a hydrostatic continuously variable transmission comprising a hydraulic pump having a plurality of pistons and a movable swash plate, the hydraulic pump being actuatable by an engine, and a hydraulic motor having a plurality of pistons and a movable swash plate, the hydraulic motor being rotatable by a hydraulic pressure generated by the hydraulic pump. When the hydraulic motor is rotated, its rotating power is transmitted at a variable speed reduction ratio to the drive wheels of a working vehicle or the like.

If the swash plate of the hydraulic pump were not accurately held in a neutral position when it should be kept in the neutral position, the hydraulic pressure generated by the hydraulic pump would tend to leak to the hydraulic motor. Therefore, when the engine is in operation, the hydraulic motor would apply rotating power to the drive wheels, causing the vehicle to move. Alternatively, when the engine is started, the hydraulic pump would produce an abrupt pressure leakage causing the hydraulic motor to move the vehicle suddenly.

One solution to the above problem is disclosed in Japanese laid-open patent publication No. 62-253967. According to the disclosed axial-piston machine, an orifice is disposed in a bypass passage interconnecting high- and low-pressure fluid passages which are connected to a hydraulic pump and a hydraulic motor. When an unwanted hydraulic pressure is generated by the hydraulic pump due to the swash plate being shifted out of the neutral position, the hydraulic pressure is relieved by the orifice in bypassing relationship to the hydraulic motor, thereby preventing drive wheels or a vehicle from moving. The orifice is defined in a bypass valve that is manually movable into the bypass passage. The high-pressure fluid passage is normally held in communication with the bypass passage through the orifice when the bypass valve is seated on a valve seat in the bypass passage.

However, since the bypass valve is manually actuated by the operator, it may not be fully seated on the valve seat due to the operator's oversight. When the bypass valve is not seated during operation, oil flows at a high rate from the high-pressure fluid passage to the low-pressure fluid passage through the bypass passage, causing the hydraulic motor to stop or lower its rotational speed. Another problem is that since oil leaks from the high-pressure fluid passage through the orifice at all times, the volumetric efficiency and hence operation efficiency of the transmission are lowered while it is in operation.

U.S. Pat. No. 4,765,228 discloses an axial piston machine with a circuit flushing arrangement. The axial piston machine has a pressure valve in the form of a conical valve body disposed in a guide pin and preloaded by a compression spring.

SUMMARY OF THE INVENTION

It is an object of the present invention to provide a hydrostatic continuously variable transmission having a pressure-responsive valve which leaks oil into an oil tank when the oil pressure generated by a hydraulic pump is lower than a predetermined pressure level as when the transmission is in a neutral position, and which prevents oil from leaking into the oil tank when the oil pressure generated by the hydraulic pump is higher than the predetermined pressure level, for thereby allowing the transmission to operate high efficiently.

Another object of the present invention is to provide a hydrostatic continuously variable transmission having a pressure-responsive valve which relieves an excessive oil pressure surge into an oil tank when the transmission starts to operate, for thereby permitting a motor vehicle with the transmission to start smoothly without undue shocks.

According to the present invention, there is provided a hydrostatic continuously variable transmission comprising a hydraulic pump actuatable by a power source for generating an oil pressure, a hydraulic motor drivable by the oil pressure generated by the hydraulic pump, oil passage means for supplying oil from the hydraulic pump to the hydraulic motor, and pressure-responsive valve means connected to the oil passage means for draining the oil from the oil passage means to an oil tank in response to a first oil pressure, lower than a predetermined pressure level, which is generated by the hydraulic pump and applied through the oil passage means, the pressure-responsive valve means being closable in response to a second oil pressure in the oil passage means, higher than the predetermined pressure level, which is generated by the hydraulic pump and applied through the oil passage means.

According to the present invention, there is also provided a hydrostatic continuously variable transmission comprising a closed hydraulic circuit comprising a hydraulic pump for selectively generating a first oil pressure lower than a predetermined pressure level and a second oil pressure higher than the predetermined pressure level, a hydraulic motor drivable by oil supplied under pressure from the hydraulic pump, and an oil supply passage connected between the hydraulic pump and the hydraulic motor, an oil tank, and a pressure-responsive valve for connecting the oil supply passage to the oil tank in response to the first oil pressure applied through the oil supply passage, and disconnecting the oil supply passage from the oil tank in response to the second oil pressure applied through the oil supply passage.

According to the present invention, there is further provided a hydrostatic continuously variable transmission comprising a hydraulic pump actuatable by a power source for generating an oil pressure, a hydraulic motor drivable by the oil pressure generated by the hydraulic pump, oil passage means for supplying oil from the hydraulic pump to the hydraulic motor, and pressure-responsive valve means connected to the oil passage means for draining the oil from the oil passage means to an oil tank in response to a rapidly-changing oil pressure, higher than a predetermined pressure level, which is generated by the hydraulic pump and applied through the oil passage means, the pressure-responsive valve means remaining closed while a slowly-changing oil pressure is being generated by the hydraulic pump and applied through the oil passage means.

According to the present invention, there is also provided a hydrostatic continuously variable transmission comprising a closed hydraulic circuit comprising a hydraulic pump for selectively generating a rapidly-changing oil pressure lower than a predetermined pressure level when the hydrostatic continuously variable transmission starts to operate, and a slowly-changing oil pressure when the hydrostatic continuously variable transmission is in normal operation after having started to operate, a hydraulic motor drivable by oil supplied under pressure from the hydraulic pump, and an oil supply passage connected between the hydraulic pump and the hydraulic motor, an oil tank, and a pressure-responsive valve for connecting the oil supply passage to the oil tank in response to the rapidly-changing oil pressure applied through the oil supply passage, and disconnecting the oil supply passage from the oil tank in response to the slowly-changing oil pressure applied through the oil supply passage.

According to the present invention, there is further provided a hydrostatic continuously variable transmission comprising a closed hydraulic circuit comprising a hydraulic pump for selectively generating a first oil pressure lower than a first predetermined pressure level, a second oil pressure higher than the first predetermined pressure level, and a third oil pressure higher than a second predetermined pressure level higher than the first predetermined pressure level, a hydraulic motor drivable by oil supplied under pressure from the hydraulic pump, and an oil supply passage connected between the hydraulic pump and the hydraulic motor, an oil tank, a first pressure-responsive valve for connecting the oil supply passage to the oil tank in response to the first oil pressure applied through the oil supply passage, and disconnecting the oil supply passage from the oil tank in response to the second oil pressure applied through the oil supply passage, and a second pressure-responsive valve for connecting the oil supply passage to the oil tank in response to the third oil pressure applied through the oil supply passage, and disconnecting the oil supply passage from the oil tank in response to the second oil pressure applied through the oil supply passage.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENTS

Figure 1:
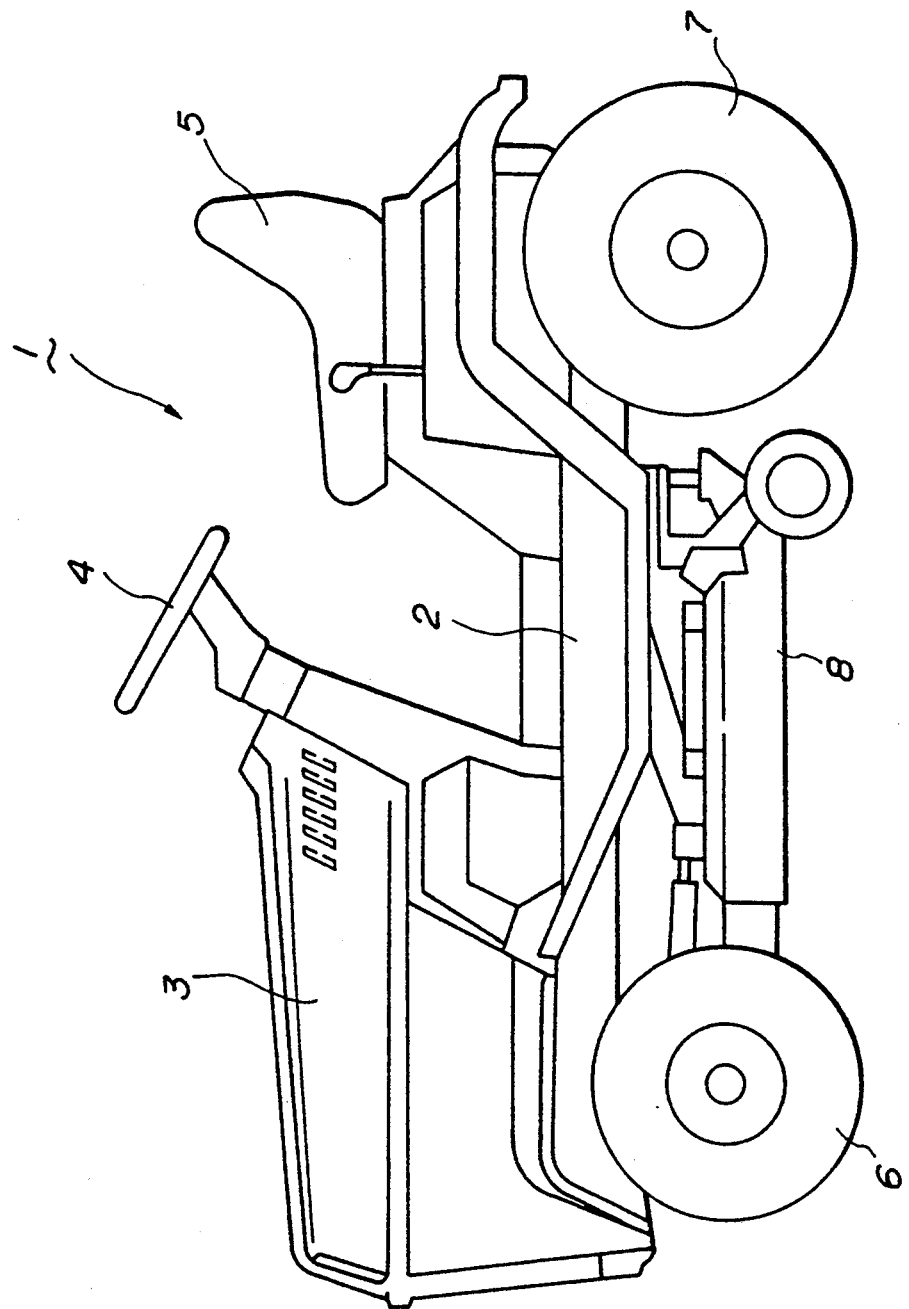
FIG. 1 is a side elevational view of a riding-type powered lawn mower incorporating a hydrostatic continuously variable transmission according to the present invention.

As shown in FIG. 1, a riding-type lawn mower 1 which is equipped with a hydrostatic continuously variable transmission according to the present invention has a vehicle body 2 including a front engine hood 3 housing an engine (not shown). The riding-type lawn mower 1 also has a steering wheel 4 positioned behind the engine hood 3 and an operator's seat 5 mounted on the vehicle body 2 in rearwardly spaced relationship to the steering wheel 4. The riding-type lawn mower 1 includes front wheels 6 that can be steered by the steering wheel 4, rear wheels 7 that can be driven by the engine, and a cutter deck 8 disposed on the lower side of the vehicle body 2 between the front and rear wheels 6, 7.

Figure 2:
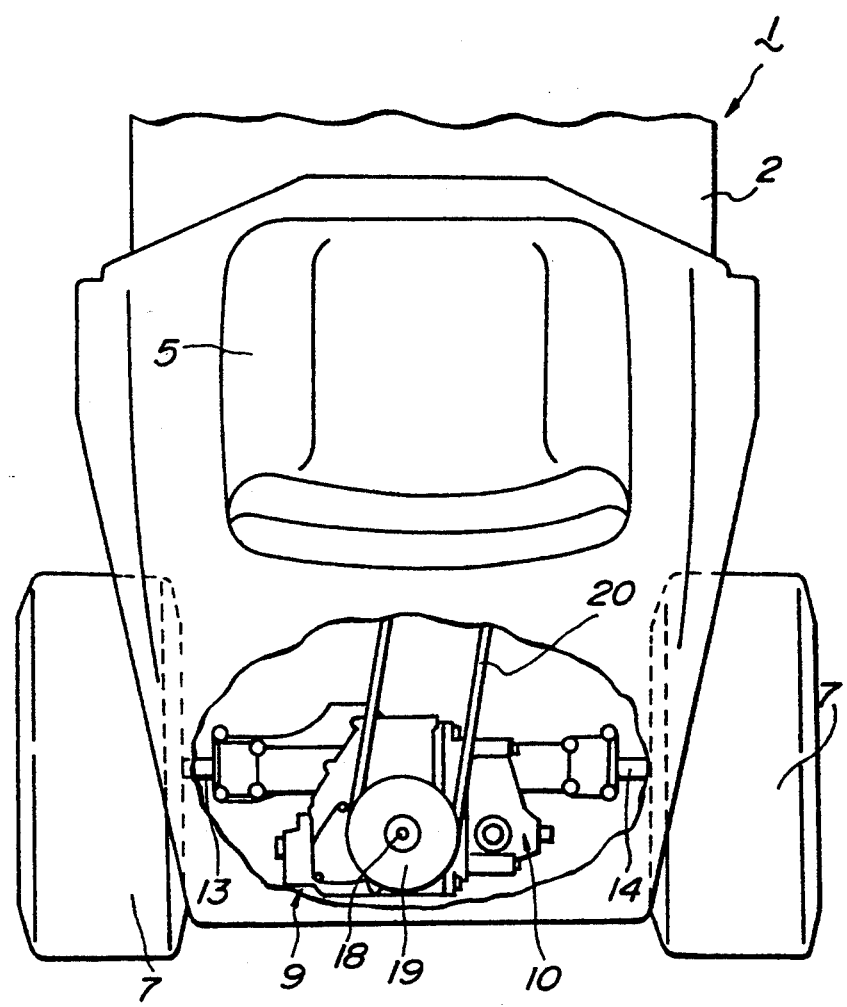
FIG. 2 is a plan view, partly broken away, of a rear portion of the riding-type powered lawn mower shown in FIG. 1, the view showing the hydrostatic continuously variable transmission.
Figure 3:
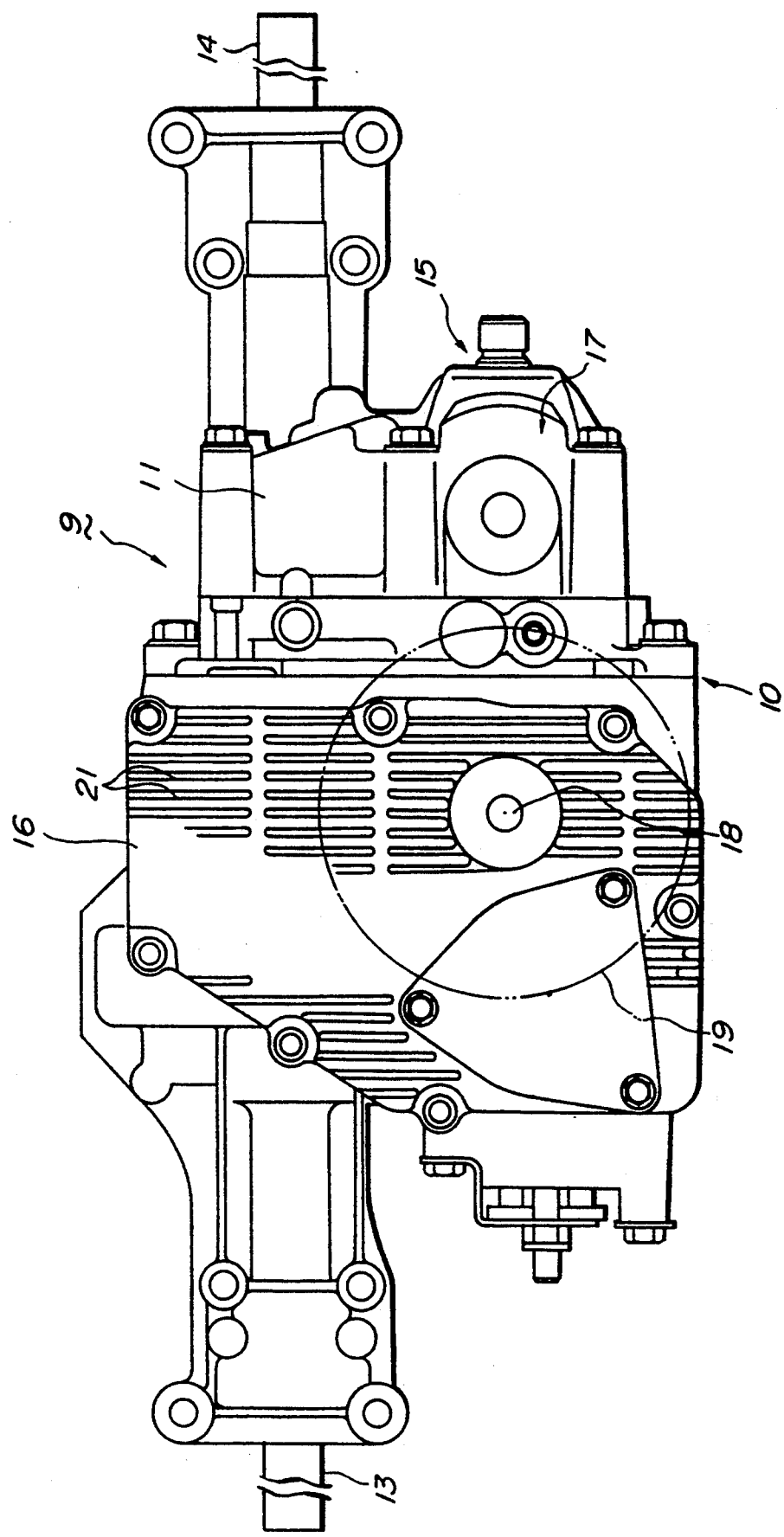
FIG. 3 is a plan view of a power unit including the hydrostatic continuously variable transmission.
Figure 4:
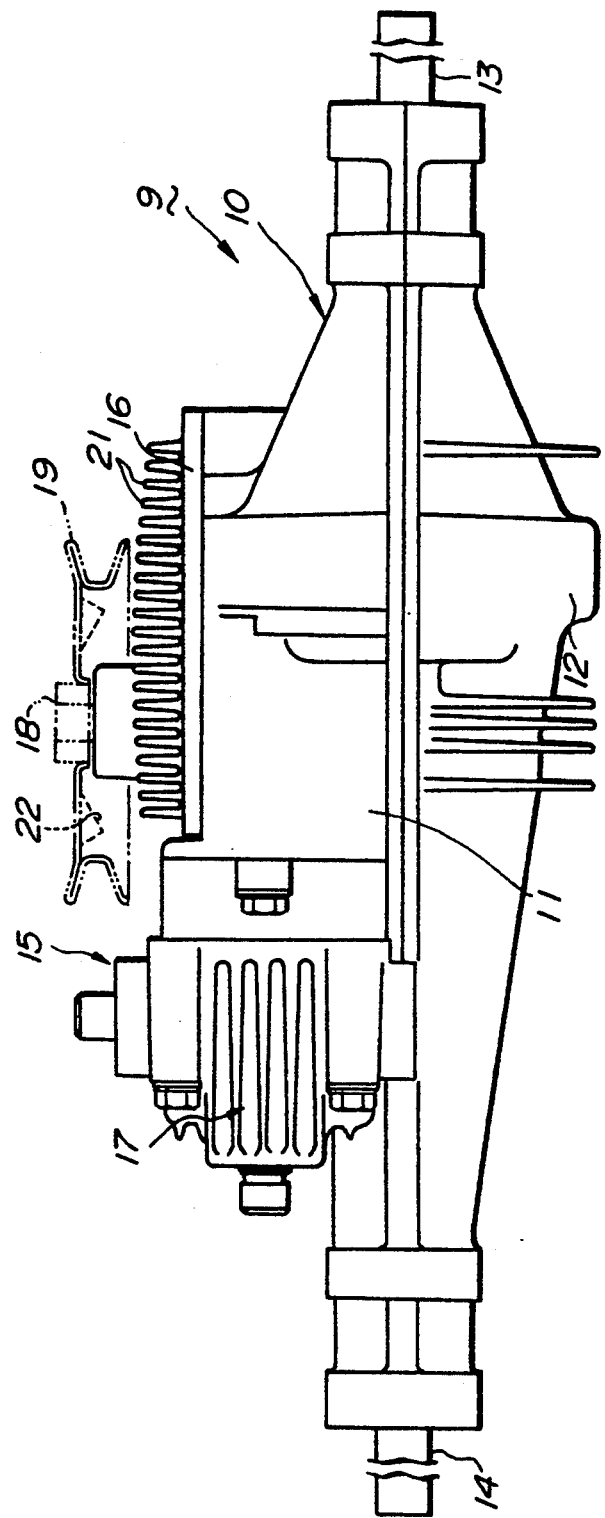
FIG. 4 is a side elevational view of the power unit.

As shown in FIG. 2, the riding-type lawn mower has a power unit 9 positioned below the operator's seat 5 for driving the rear wheels 7. As shown in FIGS. 3 and 4, the power unit 9 has a power unit case 10 which comprises an upper casing member 11 and a lower casing member 12. Axles 13, 14 project laterally from opposite sides, respectively, of the power unit case 10, and are coupled to the respective rear wheels 7. The power unit case 10 accommodates a differential (not shown).

The upper casing member 11 is combined with a hydrostatic continuously variable transmission 15 and an oil tank 23. The oil tank 23 has a cover plate 16, and the hydrostatic continuously variable transmission 15 has a housing 17, the cover plate 16 and the housing 17 being coupled to the upper casing member 11. An input shaft 18 projects upwardly from and is rotatably supported by the cover plate 16, and a pulley 19 is fixedly mounted on the projected upper end of the input shaft 18. An endless belt 20 (see FIG. 2) is trained around the pulley 19 and another pulley (not shown) fixed to the output shaft of the engine, so that the pulley 19 and hence the input shaft 18 can be rotated by the engine through the belt 20.

The cover plate 16 has a number of cooling fins 21 on its upper surface, and the pulley 19 has a cooling fan 22. Therefore, when the pulley 19 is rotated, the cooling fan 22 is rotated to apply cooling air to the cooling fins 21 which radiate heat to cool oil in the oil tank 23.

Figure 5:
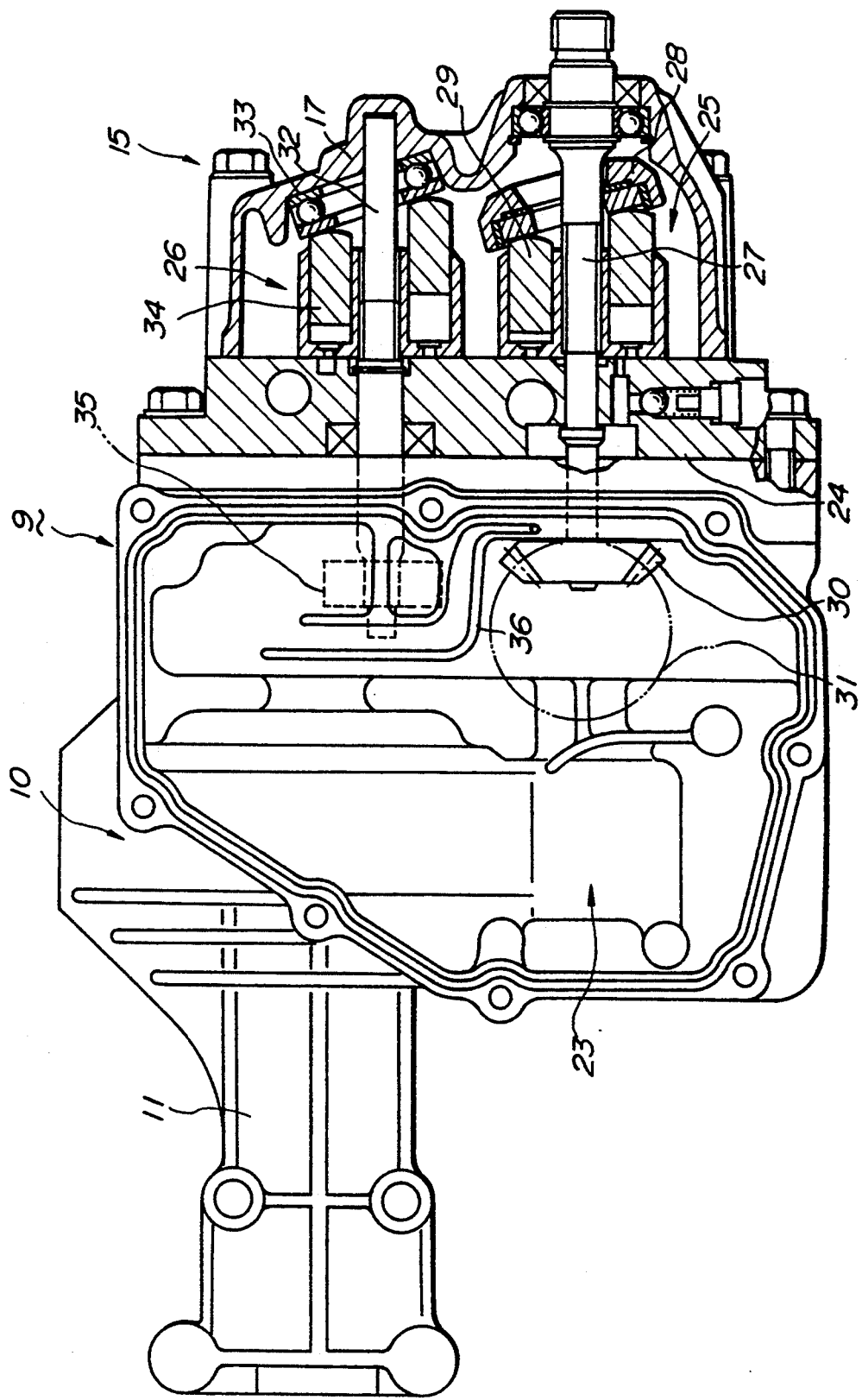
FIG. 5 is a cross-sectional view of the hydrostatic continuously variable transmission.

FIG. 5 shows the hydrostatic continuously variable transmission 15 in axial cross section with the cover plate 16 omitted from illustration. The hydrostatic continuously variable transmission 15 has a base plate 24 disposed adjacent to the oil tank 23.

The housing 17 of the hydrostatic continuously variable transmission 15 accommodates a hydraulic axial piston pump 25 actuatable by the engine and a hydraulic axial piston motor 26 rotatable by the hydraulic pump 25, the hydraulic pump 25 and the hydraulic motor 26 being mounted on the base plate 24 adjacent to each other.

The hydraulic pump 23 comprises an input shaft 27 rotatably supported on the base plate 24, a tiltable swash plate 28, and a plurality of axial pistons 29 axially slidably mounted in a cylinder casing mounted on the base plate 24 and having outer ends slidably held against the swash plate 28. The input shaft 27 has an end projecting beyond the base plate 24 into the oil tank 23 and supporting a bevel gear 30. The bevel gear 30 is held in mesh with a bevel gear 31 mounted on an inner end of the input shaft 18 which is rotatable by the engine. Therefore, when the input shaft 18 is rotated by the engine, the input shaft 27 is rotated to cause the swash plate 28 to axially move the axial pistons 29 to discharge oil.

The hydraulic motor 26 comprises an output shaft 32 rotatably supported on the base plate 24, a swash plate 33, and a plurality of axial pistons 34 axially slidably mounted in a cylinder casing mounted on the base plate 24 and having outer ends slidably held against the swash plate 33. The output shaft 32 has an end projecting beyond the base plate 24 into the oil tank 23 and supporting a pinion 35 which is operatively coupled to the axles 13, 14 through a gear mechanism (not shown).

The oil tank 23 has a labyrinth partition 36 disposed therein and extending between the bevel gears 30, 31 and the pinion 35. The labyrinth partition 36 serves to prevent oil turbulences, caused by the rotation of the bevel gears 30, 31, from adversely affecting the pinion 35.

Figure 6:
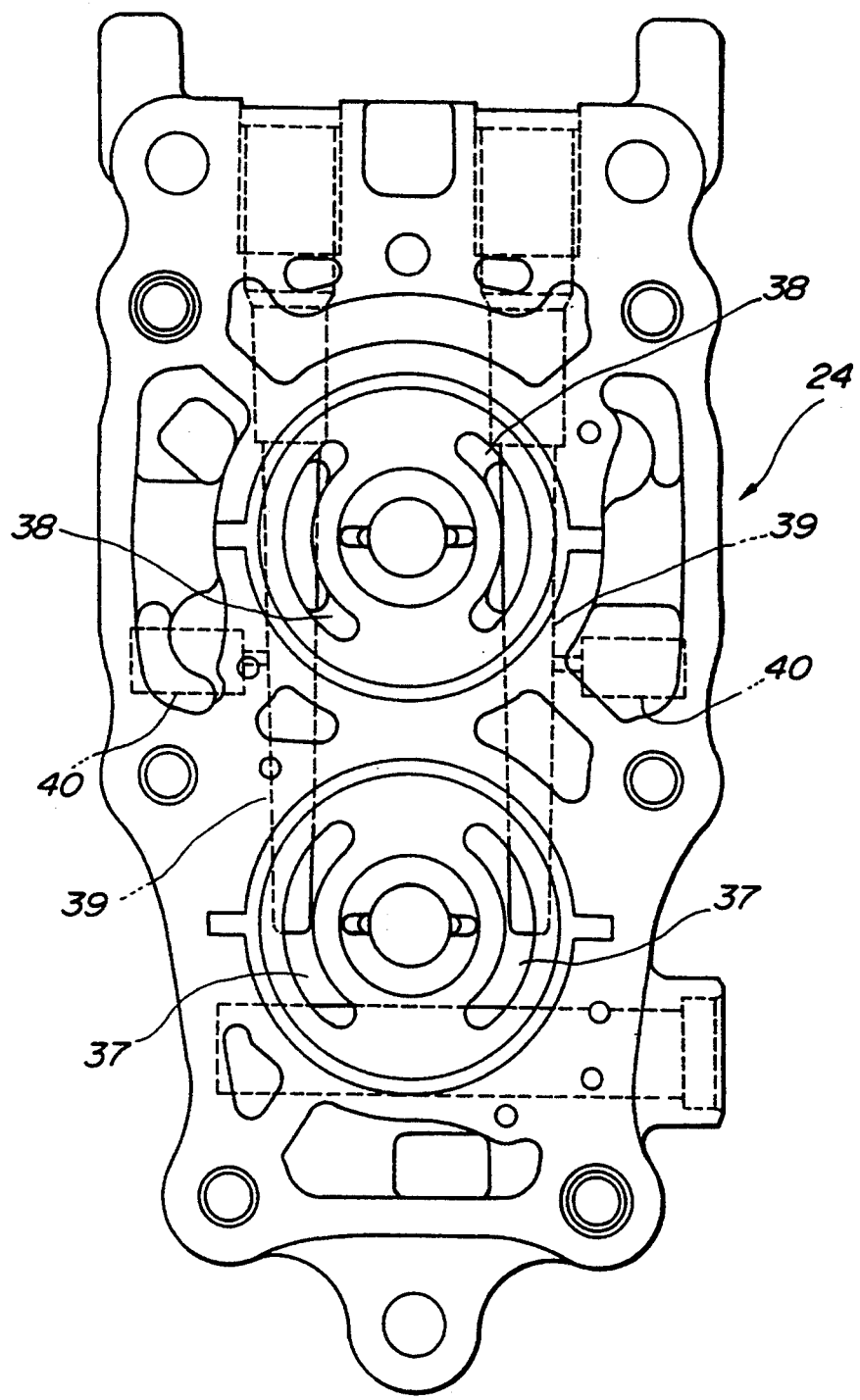
FIG. 6 is a bottom view of a base plate of the hydrostatic continuously variable transmission.

The base plate 24 has defined therein oil supply passages between the hydraulic pump 25 and the hydraulic motor 26, and also inlet and outlet passages between the hydraulic pump 25, the hydraulic motor 26, and the oil tank 23. More specifically, as shown in FIG. 6, the base plate 24 has inlet and outlet passages 37 connected to the hydraulic pump 25, and inlet and outlet passages 38 connected to the hydraulic motor 26. The base plate 24 also has a pair of oil supply passages 39 connected between the hydraulic pump 25 and the hydraulic motor 26. One of the oil supply passage 39 serve as a high-pressure oil supply passage for supplying oil under high pressure from the hydraulic pump 25 to the hydraulic motor 26, and the other as a low-pressure oil supply passage for supplying oil under low pressure from the hydraulic motor 26 to the hydraulic pump 25.

Figure 7:
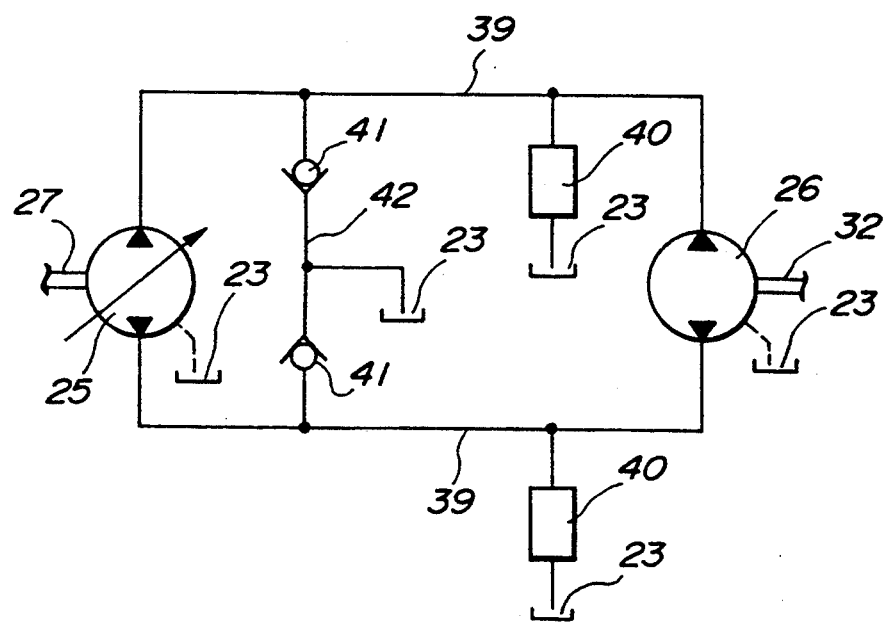
FIG. 7 is a diagram showing a hydraulic circuit of the hydrostatic continuously variable transmission.

As shown in FIG. 7, the oil supply passages 39, the hydraulic pump 25, and the hydraulic motor 26 are connected in a closed circuit. Two pressure-responsive valves 40 are connected to the respective oil supply passages 39 and also to the oil tank 23.

In FIG. 7, the hydraulic pump 25 and the hydraulic motor 26 are held in communication with the oil tank 23. The oil supply passages 39 are connected to each other by a branch oil passage 42 having a pair of check valves 41 and connected to the oil tank 23.

Figure 8:
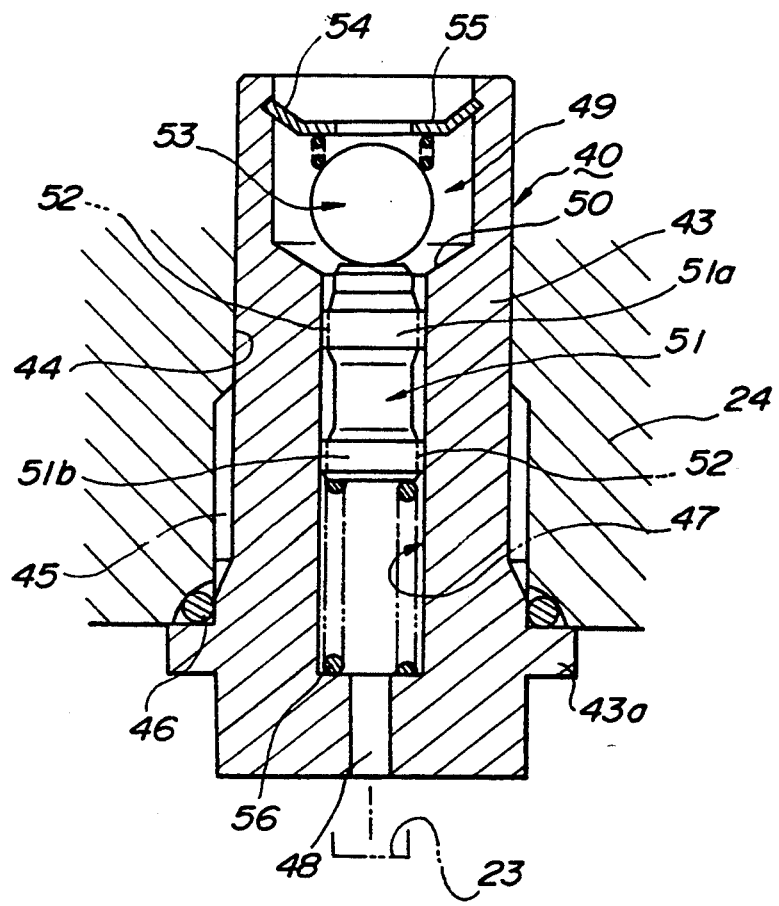
FIG. 8 is a cross-sectional view of each pressure-responsive valve in the hydrostatic continuously variable transmission.

As shown in FIG. 8, each of the pressure-responsive valves 40 comprises a plug-like cylindrical body 43 inserted in an attachment hole 44 defined in the base plate 24 and has an externally threaded surface 45 threaded in the attachment hole 44. A sealing 0-ring 46 is interposed between an open end of the attachment hole 44 and a flange 43a of the body 43 which is positioned outside of the attachment hole 44.

The body 43 has an axial hole of circular cross section defined therein which includes a first oil chamber 49 and a second oil chamber 47, the first oil chamber 49 being larger in diameter than the second oil chamber 47. The first and second oil chambers 49, 47 are held in axial communication with each other. The body 43 has a tapered valve seat 50 facing into the first oil chamber 49. The first oil chamber 49 is open at one end of the body 43 (the upper end as viewed in FIG. 8) and connected to the oil supply passage 39 through an oil passage. The second oil chamber 47 is positioned substantially centrally in the body 43 and elongate axially downstream of the first oil chamber 49 with respect to the oil supply passage 39. The second oil chamber 47 has a downstream end connected to the oil tank 23 through a smaller-diameter communication passage 48 defined in the body 43 remotely from the first oil chamber 49.

A piston 51 in the form of a spool valve is slidably disposed in the second oil chamber 47. The piston 51 has a pair of axially spaced larger-diameter lands 51a, 51b snugly fitted slidably in the second oil chamber 47. Each of the lands 51a, 51b has a plurality of axial grooves defined in an outer circumferential surface thereof, the grooves serving as orifices 52 between the piston 51 and the wall of the second oil chamber 47.

A ball valve body 53 is movably positioned in the first oil chamber 49 and rests on the upstream end of the piston 51. The ball valve body 53 is normally urged in an axial direction to be seated on the tapered valve seat 50, thus closing the second oil chamber 47, by a coil spring 55 which is disposed under compression between the ball valve 53 and a ring-shaped spring seat 54 that is securely retained in the first oil chamber 49 upstream of the ball valve body 53.

Another coil spring 56 is disposed under compression between the downstream end of the piston 51 and the downstream end, i.e., the bottom, of the second oil chamber 47 for normally biasing the piston 51 upstream, i.e., toward the ball valve body 53.

Under the bias of the coil spring 56, the piston 51 is axially displaced upstream with its upstream end abutting against the ball valve body 53, lifting the ball valve body 53 off the valve seat 50 against the forces of the coil spring 55. When the oil pressure in the oil supply passage 39 is relatively low, therefore, the ball valve body 53 is unseated off the valve seat 50 under the resiliency of the coil spring 56, thereby opening the second oil chamber 49 into communication with the second oil chamber 47. The spring forces of the coil springs 55, 56 are selected such that when the oil pressure in the oil supply passage 39 is nil or lower than a predetermined pressure level (described later on), the coil springs 55, 56 counterbalance each other, keeping the ball valve body 53 lifted off the valve seat 50.

When the hydraulic pump 25 is in an exact neutral position, placing the hydrostatic continuously variable transmission 15 in its neutral position, the hydraulic pump 25 does not apply any hydraulic pressure to the hydraulic motor 26. To set the hydraulic pump 25 in the exact neutral position, it is necessary to angularly place its swash plate 28 accurately in its neutral position. If the swash plate 28 is not accurately held in, but close to, the neutral position, then the hydraulic pump 25 is actuated by the drive power from the engine as it continuously operates even at low speed such as upon idling, supplying leakage oil under a low pressure to the hydraulic motor 26. Therefore, the hydraulic motor 26 would be actuated by the leakage oil from the hydraulic pump 25, generating a creep torque.

It is sometimes difficult to set the swash plate 28 accurately in the neutral position because of manufacturing and assembling errors of the swash plate 28, the axial pistons 29, and other components of the hydraulic pump 25.

According to the present invention, while the hydrostatic continuously variable transmission 15 is in its neutral position, the insofar as the pressure of such low-pressure leakage oil supplied from the hydraulic pump 25 is lower than a predetermined pressure level $\alpha$ ranging from 5 to 15 Kgf/cm$^2$, each of the pressure-responsive valves 40 remains open, draining the leakage oil from the oil supply passage 39 to the oil tank 23. More specifically, the leakage oil flows from the oil supply passage 39 into the first oil chamber 49. Since the pressure of the leakage oil is lower than the predetermined pressure level $\alpha$, the leakage oil does not force the ball valve body 53 to be seated on the valve seat 50, but rather flows from the first oil chamber 49 into the second oil chamber 47 through the orifices 52 of the piston 51, and is then drained through the communication passage 48 into the oil tank 23. Accordingly, the low-pressure leakage oil supplied from the hydraulic pump 25 while the transmission 15 is in its neutral position leaks through the pressure-responsive valves 40 into the oil tank 23.

Therefore, the low-pressure leakage oil that is delivered from the hydraulic pump 25 while the engine is in operation with the transmission 15 in the neutral position is not supplied to the hydraulic motor 26. When the transmission 15 is in the neutral position, the hydraulic motor 26 is not actuated, and hence no creep torque is produced.

The predetermined pressure level $\alpha$ ranges from 5 to 15 Kgf/cm$^2$ in view of various speed reduction ratios of the transmission 15. For example, when the riding-type lawn mower 1 runs on a flat concrete surface at a speed of 7 km/hour, the predetermined pressure level $\alpha$ is 10 Kgf/cm$^2$.

Figure 9:
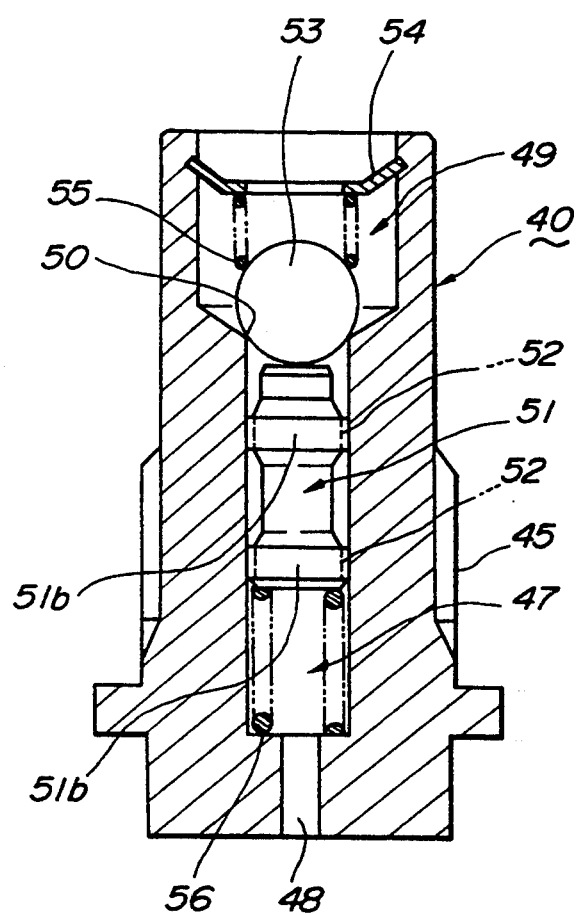
FIG. 9 is a cross-sectional view of the pressure-responsive valve at the time a high pressure is applied thereto.

When the transmission 15 is shifted out of the neutral position to move the riding-type lawn mower 1, the hydraulic pump 25 supplies oil under a high pressure, higher than the predetermined pressure level $\alpha$, into the oil supply passages 39. The high-pressure oil flows from the oil supply passages 39 into the first oil chamber 49, forcing the ball valve body 53 to be seated on the valve seat 50 against the bias of the coil spring 56. When the ball valve body 53 is seated on the valve seat 50 under the oil pressure in the first oil chamber 49, the ball valve body 53 pushes the piston 51 into the second oil chamber 47 and closes the second oil chamber 47 out of communication with the first oil chamber 49, as shown in FIG. 9. Therefore, the oil supply passages 39 are disconnected from the oil tank 23 by the pressure-responsive valves 40.

Consequently, as long as the pressure of the oil supplied from the hydraulic pump 25 is higher than the predetermined pressure level $\alpha$, the oil is supplied from the hydraulic pump 25 through the oil supply passages 39 to the hydraulic motor 26, actuating the hydraulic motor 26. When the oil pressure produced by the hydraulic pump 25 is higher than the predetermined pressure level $\alpha$, no oil leaks into the oil tank 23 through the pressure-responsive valves 40. Thus, while the transmission 15 is in operation, its volumetric efficiency and hence operation efficiency are high.

Figure 10:
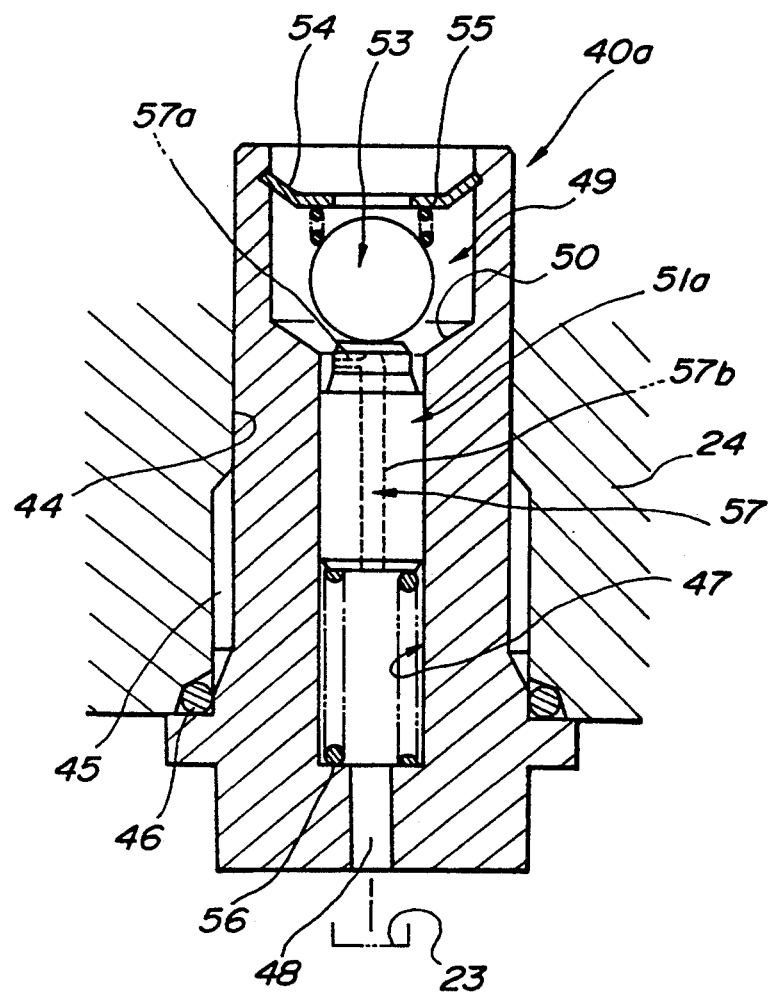
FIG. 10 is a cross-sectional view of a modified pressure-responsive valve.

FIG. 10 shows a modified pressure-responsive valve 40a. Those parts shown in FIG. 10 which are identical to those shown in FIG. 8 are denoted by identical reference numerals, and will not be described in detail below.

The modified pressure-responsive valve 40a includes a piston 51a slidably disposed in the second oil chamber 47, the piston 51a having an orifice 57 defined coaxially therein. The orifice 57 has a radial inlet passage 57a positioned near the upstream end of the piston 51a and opening radially outwardly in communication with the first oil chamber 49, and an axial main passage 57b having an upstream end joined to the radially inner end of the radial inlet passage 57a and a downstream end opening at the downstream end of the piston 51a in communication with the second oil chamber 47. When the ball valve body 53 is unseated off the valve seat 50, oil flowing from the first oil chamber 49 enters the radial inlet passage 57a and flows through the axial main passage 57b into the second oil chamber 47.

Figure 11:
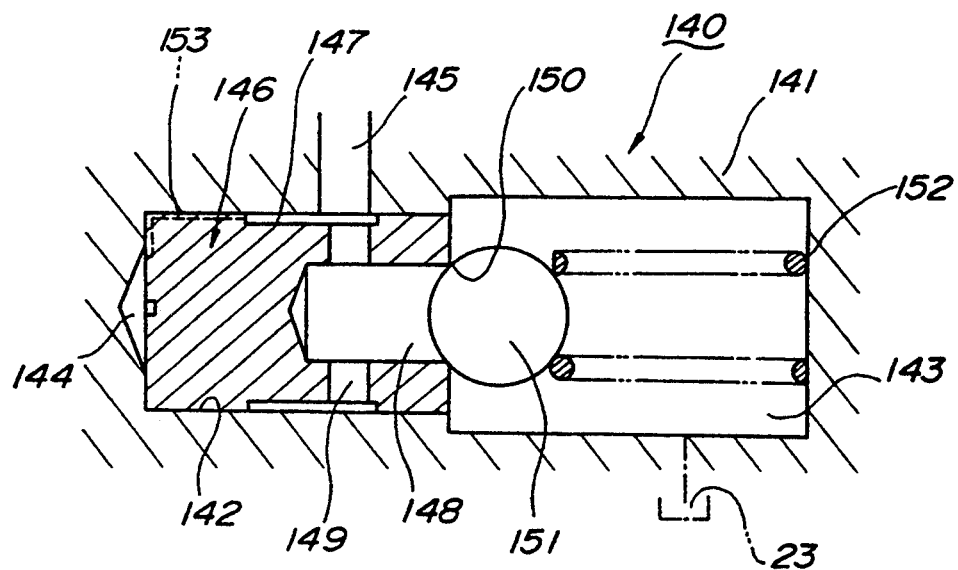
FIG. 11 is a cross-sectional view of a pressure-responsive valve according to another embodiment of the present invention.
Figure 12:
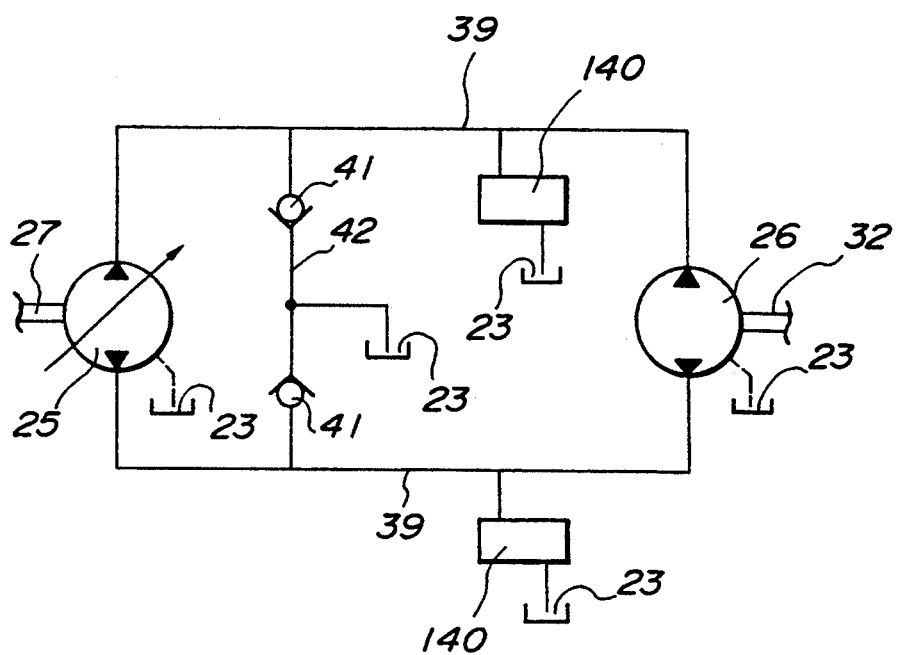
FIG. 12 is a diagram showing a hydraulic circuit which has pressure-responsive valves shown in FIG. 11.

FIG. 11 illustrates a pressure-responsive valve according to another embodiment of the present invention. The pressure-responsive valve, generally designated by the reference numeral 140, is connected between each of the oil supply passages 39 and the oil tank 23 as shown in FIG. 12.

The pressure-responsive valve 140 has a cylinder bore 142 and an oil chamber 143 which are defined in a body 141 in communication with each other. The oil chamber 143 communicates with the oil tank 23.

The cylinder bore 142 has one axial end communicating with the oil chamber 143 and the opposite axial end closed with a reservoir 144 of small volume which extends axially remotely from the oil chamber 143. The body 141 has an oil passage 145 defined therein radially with respect to the cylinder bore 142. The oil passage 145 communicates with the oil supply passage 39.

The pressure-responsive valve 140 also has a piston 146 slidably fitted in the cylinder bore 142. The piston 146 has an annular groove 147 defined in an outer circumferential surface thereof and connected to the oil passage 145. The piston 146 also has an axial passage 148 defined coaxially therein which has one end opening into the oil chamber 143. The circumferential edge of the open end of the axial passage 148 serves as a valve seat 150. The axial passage 148 has an opposite blind end. The axial passage 148 is connected to the annular groove 147 by a radial communication passage 149 that is defined diametrically in the piston 146.

A ball valve body 151, which is movably disposed in the oil chamber 143, is normally urged to be seated on the valve seat 150, thus closing the axial passage 148 out of communication with the oil chamber 143, under the bias of a coil spring 152 disposed under compression between the ball valve body 151 and an end of the oil chamber 143.

The piston 146 has an orifice 153 defined in outer circumferential and end surfaces thereof and interconnecting the annular groove 147 and the reservoir 144.

The spring force of the coil spring 152 is selected to overcome a slowly-changing oil pressure which is applied from the hydraulic pump 25 to the ball valve body 151 while the riding-type lawn mower 1 is in normal operation. On the other hand, when a rapidly-changing excessive oil pressure, which is higher than a predetermined pressure level ranging from 40 to 50 Kgf/cm$^2$ when the riding-type lawn mower 1 starts to move, is applied to the ball valve body 151, the ball valve body 151 is unseated off the valve seat 150 against the bias of the coil spring 152, thus opening the pressure-responsive valve 140.

While the hydraulic pump 15 is applying a slowly-changing oil pressure to the hydraulic motor 26 when the lawn mower 1 is in normal operation, the oil flows from the oil passage 145 through the communication passage 149 into the axial passage 148. However, since the coil spring 152 is strong enough to overcome the oil pressure applied to the ball valve body 151, the ball valve body 151 remains seated on the valve seat 150. Therefore, the pressure-responsive valves 140 are closed, and the oil pressure is applied from the hydraulic pump 25 through the oil supply passages 39 to the hydraulic motor 26, without oil leaking to the oil tank 23. Accordingly, the lawn mower 1 runs or operates efficiently.

At the same time, the oil from the hydraulic pump 25 flows through the annular groove 147 and the orifice 153 into the reservoir 144. The oil pressure in the reservoir 144 behind the piston 146 builds up, applying a force tending to move the piston 146 to the right (FIG. 11). Since the piston 146 is pressed against the ball valve body 151 that is spring-loaded, the ball valve body 151 is seated on the valve seat 150 more strongly.

The orifice 153 may not necessarily be required and may be omitted insofar as there is a clearance on the order of microns between the outer circumferential surface of the piston 146 and the inner circumferential surface of the cylinder bore 142, because the oil supplied to the annular groove 147 flows under pressure through such a clearance into the reservoir 144.

When the lawn mower 1 starts to move from a stop, the hydraulic pump 25 develops a temporary quick pressure buildup, producing a rapidly-changing excessive oil pressure in the oil passage 145 and hence the axial passage 148. The rapidly-changing excessive oil pressure, which is higher than the predetermined pressure level ranging from 40 to 50 Kgf/cm$^2$, is strong enough to displace the ball valve body 151 off the valve seat 150 against the bias of the coil spring 152, bringing the axial passage 148 into communication with the oil chamber 143. Therefore, the oil supply passages 39 are connected to the oil tank 23 by the pressure-responsive valves 140. Since the oil supply passages 39 are connected to the oil tank 23, the excessive oil pressure surge is drained to the oil tank 23, allowing the lawn mower 1 to start smoothly without shocks.

After the lawn mower 1 has started to move, the oil pressure from the hydraulic pump 25 drops to a slowly-changing oil pressure. Therefore, the ball valve body 151 is seated on the valve seat 150 under the bias of the coil spring 152. The pressure-responsive valves 140 are closed, disconnecting the oil supply passages 39 from the oil tank 23. The volumetric efficiency of the transmission 15 is restored to a normal volumetric efficiency in normal operation.

When the oil pressure applied from the oil passage 145 is slowly increased while the lawn mower 1 is in normal operation, the supplied oil flows from the annular groove 147 through the clearance 153 into the reservoir 144, resulting in a pressure buildup in the reservoir 144. The pressure buildup in the reservoir 144 displaces the piston 146 toward the oil chamber 143, pushing the ball valve body 151 while compressing the coil spring 152. The piston 146 is held in contact with the ball valve body 151 under increased pressure, keeping the ball valve body 151 seated on the valve seat 150. Consequently, even when the slowly-changing oil pressure in the axial passage 148 is increased, the ball valve body 151 maintains the axial passage 148 closed out of communication with the oil chamber 143.

A modification of the pressure-responsive valve shown in FIG. 11 will be described below with reference to FIG. 13.

Figure 13:
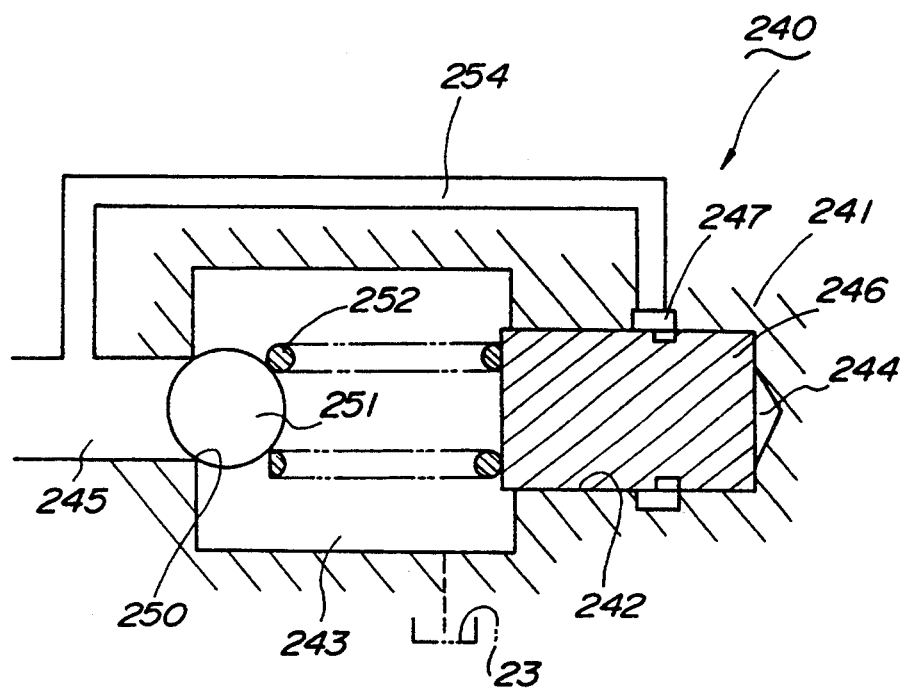
FIG. 13 is a cross-sectional view of a modification of the pressure-responsive valve shown in FIG. 11.

The modified pressure-responsive valve, generally designated by the reference numeral 240 in FIG. 13, has an oil passage 245 connected to the oil supply passage 39, an oil chamber 243 communicating with the oil passage 245 and connected to the oil tank 23, and a cylinder bore 242 opening into the oil chamber 243. The oil passage 245, the oil chamber 243, and the cylinder bore 242 are defined coaxially in a body 241.

The cylinder bore 242 has a reservoir 244 remote from its end opening into the oil chamber 243. A piston 246 is slidably fitted in the cylinder bore 242. The end of the oil passage 245 which opens into the oil chamber 243 has a circumferential edge serving as a valve seat 250. A ball valve body 251 is movably disposed in the oil chamber 243, and is normally seated on the valve seat 250 by a coil spring 252 disposed under compression between the ball valve body 251 and an end of the piston 246 which is exposed into the oil chamber 243.

There is a clearance between the outer circumferential surface of the piston 246 and the inner circumferential surface of the cylinder bore 242, the clearance communicating with the reservoir 244. The inner circumferential surface of the cylinder bore 242 has an annular groove 247 defined therein around the piston 246. The annular groove 247 is connected to the oil passage 245 through a communication passage 254 defined in the body 241.

The oil pressure from the oil supply passage 39 acts on the ball valve body 251 through the oil passage 245, and also in the reservoir 244 through the oil passage 245, the communication passage 254, the annular groove 247, and the clearance.

While a slowly-changing oil pressure is being generated by the hydraulic pump 25 during normal operation of the lawn mower 1 and being applied to the ball valve body 251, the coil spring 252 is strong enough to keep the ball valve body 251 seated on the valve seat 250. Therefore, the oil supply passage 39 are disconnected from the oil tank 23, and no oil leaks from the oil supply passage 39 into the oil tank 23.

When a rapidly-changing excessive oil pressure is applied from the hydraulic pump 25 to the ball valve body 251 at the time the lawn mower 1 is started, the ball valve body 251 is unseated off the valve seat 250 against the bias of the coil spring 252. The excessive oil pressure surge from the oil passage 245 is now relieved through the oil chamber 243 into the oil tank 23, so that the lawn mower 1 can be started smoothly without undue shocks. After the lawn mower 1 has started to move, the piston 246 is displaced to the left (FIG. 13) under a pressure buildup in the reservoir 244, compressing the coil spring 252 to force the ball valve body 251 to be seated on the valve seat 250. While the lawn mower 1 is in normal operation, therefore, no oil pressure leaks from the oil supply passage 39 into the oil tank 23. The transmission 15 can thus operate with high efficiency.

Figure 14:
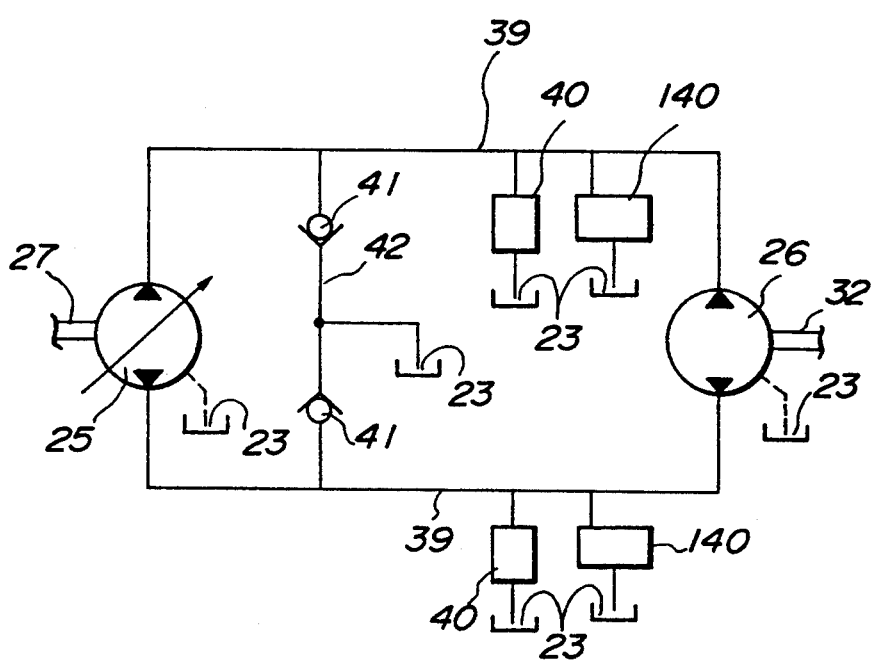
FIG. 14 is a diagram showing a hydraulic circuit of a hydrostatic continuously variable transmission according to another embodiment of the present invention.

FIG. 14 shows a hydraulic circuit of a hydrostatic continuously variable transmission according to another embodiment of the present invention. The hydrostatic continuously variable transmission shown in FIG. 14 has a pair of pressure-responsive valves 40, 140 connected to one of the oil supply passages 39, and another pair of pressure-responsive valves 40, 140 connected to the other oil supply passage 39. The pressure-responsive valves 40 are identical to those shown in FIG. 7, and the pressure-responsive valves 140 are identical to those shown in FIG. 12. Therefore, the hydrostatic continuously variable transmission shown in FIG. 14 offers a combination of the advantages of the transmissions shown in FIGS. 7 and 12. More specifically, when the lawn mower 1 is started, a rapidly-changing excessive oil pressure generated by the hydraulic pump 25 is drained through the pressure-responsive valves 140 to the oil tank 23. While the lawn mower 1 and hence the transmission 15 is in normal operation, the oil pressure generated by the hydraulic pump 25 is applied, without leakage, to the hydraulic motor 26 because the pressure-responsive valves 40, 140 are closed. When the transmission 15 is in its neutral position, any oil pressure produced by the hydraulic pump 25 is drained to the oil tank 23 by the pressure-responsive valves 40 which are open.

In the above embodiments, the ball valve bodies 53, 151, 251 are employed to relieve an excessive oil pressure surface into the oil tank 23 when the lawn mower 1 is started. However, any of various other valve bodies, such as a poppet valve body, may be used instead.

While the hydrostatic continuously variable transmission according to the present invention has been shown and described as being incorporated in a riding-type lawn mower, it may be installed on any of various other vehicles or machines.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A hydrostatic continuously variable transmission comprising:
   a hydraulic pump actuatable by a power source for generating an oil pressure;
   a hydraulic motor drivable by the oil pressure generated by said hydraulic pump;
   oil passage means for supplying oil from said hydraulic pump to said hydraulic motor; and
   pressure-responsive valve means connected to said oil passage means for draining the oil from said oil passage means to an oil tank in response to a first oil pressure, lower than a predetermined pressure level, which is generated by said hydraulic pump and applied through said oil passage means, said pressure-responsive valve means being closable in response to a second oil pressure in said oil passage means, higher than said predetermined pressure level, which is generated by said hydraulic pump and applied through said oil passage means.

2. A hydrostatic continuously variable transmission according to claim 1, wherein said pressure-responsive valve means comprises:
   a body having a first oil chamber and a second chamber, said first and second oil chambers communicating with each other for connecting said oil passage means to the oil tank, said body having a valve seat facing into said first oil chamber;
   a piston axially slidably disposed in said second oil chamber and having an orifice for providing communication between said first and second oil chambers;
   a valve body movably disposed in said first oil chamber and held against said piston;
   first spring means disposed in said first oil chamber for normally urging said valve body against said piston; and
   second spring means disposed in said second oil chamber for normally urging said piston to unseat said valve body off said valve seat against said first spring means when said first oil pressure is in said oil passage means, said valve body being seatable on said valve seat against said second spring means for closing said second oil chamber out of communication with said first oil chamber, when said second oil pressure is in said oil passage means.

3. A hydrostatic continuously variable transmission according to claim 2, wherein said first oil chamber is greater in diameter than said second oil chamber, said second oil chamber being elongate axially with respect to said piston, said first spring means comprising a coil spring acting between said valve body and said body, said second spring means comprising a coil spring acting between an end of said piston and a bottom of said second oil chamber.

4. A hydrostatic continuously variable transmission according to claim 3, wherein said valve body comprises a ball valve body.

5. A hydrostatic continuously variable transmission according to claim 2, wherein said orifice is defined in an outer circumferential surface of said piston and extends axially with respect to said piston.

6. A hydrostatic continuously variable transmission according to claim 2, wherein said orifice is defined axially in said piston.

7. A hydrostatic continuously variable transmission according to claim 1, wherein said oil passage means comprises a pair of oil supply passages connected between said hydraulic pump and said hydraulic motor, said pressure-responsive valve means comprising a pair of pressure-responsive valves, respectively, connected to said oil supply passages, respectively.

8. A hydrostatic continuously variable transmission according to claim 7, wherein each of said pressure-responsive valves comprises:
   a body having a first oil chamber and a second chamber, said first and second oil chambers communicating with each other for connecting one of said oil supply passages to the oil tank, said body having a valve seat facing into said first oil chamber;
   a piston axially slidably disposed in said second oil chamber and having an orifice for providing communication between said first and second oil chambers;
   a valve body movably disposed in said first oil chamber and held against said piston;
   first spring means disposed in said first oil chamber for normally urging said valve body against said piston; and
   second spring means disposed in said second oil chamber for normally urging said piston to unseat said valve body off said valve seat against said first spring means when said first oil pressure is in said oil passage means, said valve body being seatable on said valve seat against said second spring means, closing said second oil chamber out of communication with said first oil chamber, when said second oil pressure is in said oil passage means.

9. A hydrostatic continuously variable transmission according to claim 8, wherein said first oil chamber is greater in diameter than said second oil chamber, said second oil chamber being elongate axially with respect to said piston, said first spring means comprising a coil spring acting between said valve body and said body, said second spring means comprising a coil spring acting between an end of said piston and a bottom of said second oil chamber.

10. A hydrostatic continuously variable transmission according to claim 9, wherein said valve body comprises a ball valve body.

11. A hydrostatic continuously variable transmission according to claim 8, wherein said orifice is defined in an outer circumferential surface of said piston and extends axially with respect to said piston.

12. A hydrostatic continuously variable transmission according to claim 8, wherein said orifice is defined axially in said piston.

13. A hydrostatic continuously variable transmission according to claim 1, wherein said hydraulic pump generates said first oil pressure when the hydrostatic continuously variable transmission is in a neutral position.

14. A hydrostatic continuously variable transmission according to claim 1, wherein said hydraulic pump generates said second oil pressure when the hydrostatic continuously variable transmission is shifted out of a neutral position.

15. A hydrostatic continuously variable transmission comprising:
- a closed hydraulic circuit comprising:
  - a hydraulic pump for selectively generating a first oil pressure lower than a predetermined pressure level and a second oil pressure higher than said predetermined pressure level;
  - a hydraulic motor drivable by oil supplied under pressure from said hydraulic pump; and
  - an oil supply passage connected between said hydraulic pump and said hydraulic motor;
- an oil tank; and
- a pressure-responsive valve for connecting said oil supply passage to said oil tank in response to said first oil pressure applied through said oil supply passage, and disconnecting said oil supply passage from said oil tank in response to said second oil pressure applied through said oil supply passage.

16. A hydrostatic continuously variable transmission according to claim 15, wherein said pressure-responsive valve comprises:
- a body having a first oil chamber and a second chamber, said first and second oil chambers communicating with each other for connecting said oil supply passage to the oil tank, said body having a valve seat facing into said first oil chamber;
- a piston axially slidably disposed in said second oil chamber and having an orifice for providing communication between said first and second oil chambers;
- a valve body movably disposed in said first oil chamber and held against said piston;
- first spring means disposed in said first oil chamber for normally urging said valve body against said piston; and
- second spring means disposed in said second oil chamber for normally urging said piston to unseat said valve body off said valve seat against said first spring means when said first oil pressure is in said oil supply passage, said valve body being seatable on said valve seat against said second spring means to close said second oil chamber out of communication with said first oil chamber, when said second oil pressure is in said oil supply passage.

17. A hydrostatic continuously variable transmission according to claim 16, wherein said first oil chamber is greater in diameter than said second oil chamber, said second oil chamber being elongate axially with respect to said piston, said first spring means comprising a coil spring acting between said valve body and said body, said second spring means comprising a coil spring acting between an end of said piston and a bottom of said second oil chamber.

18. A hydrostatic continuously variable transmission according to claim 17, wherein said valve body comprises a ball valve body.

19. A hydrostatic continuously variable transmission according to claim 16, wherein said orifice is defined in an outer circumferential surface of said piston and extends axially with respect to said piston.

20. A hydrostatic continuously variable transmission according to claim 16, wherein said orifice is defined axially in said piston.

21. A hydrostatic continuously variable transmission according to claim 15, wherein said hydraulic pump generates said first oil pressure when the hydrostatic continuously variable transmission is in a neutral position.

22. A hydrostatic continuously variable transmission according to claim 15, wherein said hydraulic pump generates said second oil pressure when the hydrostatic continuously variable transmission is shifted out of a neutral position.

23. A hydrostatic continuously variable transmission comprising:
- a hydraulic pump actuatable by a power source for generating an oil pressure;
- a hydraulic motor drivable by the oil pressure generated by said hydraulic pump;
- oil passage means for supplying oil from said hydraulic pump to said hydraulic motor; and
- pressure-responsive valve means connected to said oil passage means for draining the oil from said oil passage means to an oil tank in response to a rapidly-changing oil pressure, higher than a predetermined pressure level, which is generated by said hydraulic pump and applied through said oil passage means, said pressure-responsive valve means remaining closed while a slowly-changing oil pressure is being generated by said hydraulic pump and applied through said oil passage means.

24. A hydrostatic continuously variable transmission according to claim 23, wherein said pressure-responsive valve means comprises:
- a body;
- an oil passage defined in said body and connected to said oil passage means;
- an oil chamber defined in said body and connected to said oil tank;

a cylinder bore defined in said body and connected to said oil chamber and communicating with said oil passage;

a piston slidably fitted in said cylinder bore and having an axial passage connected to said oil passage, said axial passage having an axial open end opening into said oil chamber and providing a valve seat;

a valve body movably disposed in said oil chamber; and spring means disposed in said oil chamber for normally urging said valve body against said valve seat to close said axial passage while said slowly-changing oil pressure is being applied through said oil passage means into said axial passage, said valve body being unseatable from said valve seat against said spring means to open said axial passage under said rapidly-changing oil pressure which is applied through said oil passage means into said axial passage.

25. A hydrostatic continuously variable transmission according to claim 24, wherein said cylinder bore has a reservoir at an axial end of the piston remote from said oil chamber, further comprising communication means for introducing the oil from said oil passage means into said reservoir.

26. A hydrostatic continuously variable transmission according to claim 25, wherein said communication means comprises an orifice defined in an outer circumferential surface of said piston.

27. A hydrostatic continuously variable transmission according to claim 23, wherein said pressure-responsive valve means comprises:

a body;

an oil passage defined in said body and connected to said oil passage means;

an oil chamber defined in said body and connected to said oil tank, said oil passage having an open end opening into said oil chamber and providing a valve seat;

a cylinder bore defined in said body and connected to said oil chamber and communicating with said oil passage;

a piston slidably fitted in said cylinder bore;

a valve body movably disposed in said oil chamber; and spring means disposed in said oil chamber for normally urging said valve body against said valve seat to close said oil passage while said slowly-changing oil pressure is being applied through said oil passage means into said oil passage, said valve body being unseatable from said valve seat against said spring means to open said oil passage under said rapidly-changing oil pressure which is applied through said oil passage means into said oil passage.

28. A hydrostatic continuously variable transmission according to claim 27, wherein said cylinder bore has a reservoir at an axial end of the piston remote from said oil chamber, further comprising communication means for introducing the oil from said oil passage means into said reservoir.

29. A hydrostatic continuously variable transmission according to claim 24, wherein said valve body comprises a ball valve body.

30. A hydrostatic continuously variable transmission according to claim 23, wherein said oil passage means comprises a pair of oil supply passages connected between said hydraulic pump and said hydraulic motor, said pressure-responsive valve means comprising a pair of pressure-responsive valves, respectively, connected to said oil supply passages, respectively.

31. A hydrostatic continuously variable transmission according to claim 23, wherein said hydraulic pump generates said rapidly-changing oil pressure when the hydrostatic continuously variable transmission starts to operate.

32. A hydrostatic continuously variable transmission according to claim 23, wherein said hydraulic pump generates said slowly-changing oil pressure when the hydrostatic continuously variable transmission is in normal operation after having started to operate.

33. A hydrostatic continuously variable transmission comprising:

a closed hydraulic circuit comprising:

a hydraulic pump for selectively generating a rapidly-changing oil pressure lower than a predetermined pressure level when the hydrostatic continuously variable transmission starts to operate, and a slowly-changing oil pressure when the hydrostatic continuously variable transmission is in normal operation after having started to operate;

a hydraulic motor drivable by oil supplied under pressure from said hydraulic pump; and an oil supply passage connected between said hydraulic pump and said hydraulic motor;

an oil tank; and a pressure-responsive valve for connecting said oil supply passage to said oil tank in response to said rapidly-changing oil pressure applied through said oil supply passage, and disconnecting said oil supply passage from said oil tank in response to said slowly-changing oil pressure applied through said oil supply passage.

34. A hydrostatic continuously variable transmission according to claim 33, wherein said pressure-responsive valve means comprises:

a body;

an oil passage defined in said body and connected to said oil supply passage;

an oil chamber defined in said body and connected to said oil tank;

a cylinder bore defined in said body and connected to said oil chamber and communicating with said oil passage;

a piston slidably fitted in said cylinder bore and having an axial passage connected to said oil passage, said axial passage having an axial open end opening into said oil chamber and providing a valve seat;

a valve body movably disposed in said oil chamber; and spring means disposed in said oil chamber for normally urging said valve body against said valve seat to close said axial passage while said slowly-changing oil pressure is being applied through said oil supply passage into said axial passage, said valve body being unseatable from said valve seat against said spring means to open said axial passage under said rapidly-changing oil pressure which is applied through said oil supply passage into said axial passage.

35. A hydrostatic continuously variable transmission according to claim 34, wherein said cylinder bore has a reservoir at an axial end of the piston remote from said oil chamber, further comprising communication means for introducing the oil from said oil supply passage into said reservoir.

36. A hydrostatic continuously variable transmission according to claim 35, wherein said communication means comprises an orifice defined in an outer circumferential surface of said piston.

37. A hydrostatic continuously variable transmission according to claim 34, wherein said valve body comprises a ball valve body.

38. A hydrostatic continuously variable transmission according to claim 33, wherein said pressure-responsive valve means comprises:
   a body;
   an oil passage defined in said body and connected to said oil supply passage;
   an oil chamber defined in said body and connected to said oil tank, said oil passage having an open end opening into said oil chamber and providing a valve seat;
   a cylinder bore defined in said body and connected to said oil chamber and communicating with said oil passage;
   a piston slidably fitted in said cylinder bore;
   a valve body movably disposed in said oil chamber; and
   spring means disposed in said oil chamber for normally urging said valve body against said valve seat to close said oil passage while said slowly-changing oil pressure is being applied through said oil supply passage into said oil passage, said valve body being unseatable from said valve seat against said spring means to open said oil passage under said rapidly-changing oil pressure which is applied through said oil supply passage into said oil passage.

39. A hydrostatic continuously variable transmission according to claim 38, wherein said cylinder bore has a reservoir at an axial end of the piston remote from said oil chamber, further comprising communication means for introducing the oil from said oil supply passage into said reservoir.

40. A hydrostatic continuously variable transmission according to claim 38, wherein said valve body comprises a ball valve body.

41. A hydrostatic continuously variable transmission comprising:
   a closed hydraulic circuit comprising:
      a hydraulic pump for selectively generating a first oil pressure lower than a first predetermined pressure level, a second oil pressure higher than said first predetermined pressure level, and a third oil pressure higher than a second predetermined pressure level higher than said first predetermined pressure level;
      a hydraulic motor drivable by oil supplied under pressure from said hydraulic pump; and
      an oil supply passage connected between said hydraulic pump and said hydraulic motor;
   an oil tank;
   a first pressure-responsive valve for connecting said oil supply passage to said oil tank in response to said first oil pressure applied through said oil supply passage, and disconnecting said oil supply passage from said oil tank in response to said second oil pressure applied through said oil supply passage; and
   a second pressure-responsive valve for connecting said oil supply passage to said oil tank in response to said third oil pressure applied through said oil supply passage, and disconnecting said oil supply passage from said oil tank in response to said second oil pressure applied through said oil supply passage.

42. A hydrostatic continuously variable transmission according to claim 41, wherein said first pressure-responsive valve comprises:
   a body having a first oil chamber and a second chamber, said first and second oil chambers communicating with each other for connecting said oil supply passage to the oil tank, said body having a valve seat facing into said first oil chamber;
   a piston axially slidably disposed in said second oil chamber and having an orifice for providing communication between said first and second oil chambers;
   a valve body movably disposed in said first oil chamber and held against said piston;
   first spring means disposed in said first oil chamber for normally urging said valve body against said piston; and
   second spring means disposed in said second oil chamber for normally urging said piston to unseat said valve body off said valve seat against said first spring means when said first oil pressure is in said oil supply passage, said valve body being seatable on said valve seat against said second spring means to close said second oil chamber out of communication with said first oil chamber, when said second oil pressure is in said oil supply passage.

43. A hydrostatic continuously variable transmission according to claim 41, wherein said second pressure-responsive valve means comprises:
   a body;
   an oil passage defined in said body and connected to said oil supply passage;
   an oil chamber defined in said body and connected to said oil tank;
   a cylinder bore defined in said body and connected to said oil chamber and communicating with said oil passage;
   a piston slidably fitted in said cylinder bore and having an axial passage connected to said oil passage, said axial passage having an axial open end opening into said oil chamber and providing a valve seat;
   a valve body movably disposed in said oil chamber; and
   spring means disposed in said oil chamber for normally urging said valve body against said valve seat to close said axial passage while said second oil pressure is being applied through said oil supply passage into said axial passage, said valve body being unseatable from said valve seat against said spring means to open said axial passage under said third oil pressure which is applied through said oil supply passage into said axial passage.

44. A hydrostatic continuously variable transmission according to claim 41, wherein said second pressure-responsive valve means comprises:
   a body;
   an oil passage defined in said body and connected to said oil supply passage;
   an oil chamber defined in said body and connected to said oil tank, said oil passage having an open end opening into said oil chamber and providing a valve seat;
   a cylinder bore defined in said body and connected to said oil chamber and communicating with said oil passage;
   a piston slidably fitted in said cylinder bore;

a valve body movably disposed in said oil chamber; and spring means disposed in said oil chamber for normally urging said valve body against said valve seat to close said oil passage while said second oil pressure is being applied through said oil supply passage into said oil passage, said valve body being unseatable from said valve seat against said spring means to open said oil passage under said third oil pressure which is applied through said oil supply passage into said oil passage.

45. A hydrostatic continuously variable transmission according to claim 1, wherein said pressure-responsive valve comprises:

a body having a first oil chamber and a second chamber, said first and second oil chambers communicating with each other for connecting at least one of said oil supply passages to the oil tank, said body having a valve seat facing into said first oil chamber;

a piston axially slidably disposed in said second oil chamber and having an orifice for providing communication between said first and second oil chambers;

a valve body movably disposed in said first oil chamber and held against said piston;

spring means disposed in said first oil chamber for normally urging said valve body against said piston; and means disposed in said second oil chamber for normally urging said piston to unseat said valve body off said valve seat against said spring means when said first oil pressure is in said oil passage means, said valve body being seatable on said valve seat against said means, closing said second oil chamber out of communication with said first oil chamber, when said second oil pressure in said oil passage means.

46. A hydrostatic continuously variable transmission comprising:

a hydraulic pump actuatable by a power source for generating an oil pressure;

a hydraulic motor drivable by the oil pressure generated by said hydraulic pump;

oil passage means for supplying oil from said hydraulic pump to said hydraulic motor; and pressure-responsive valve means connected to said oil passage means for draining the oil from said oil passage means to an oil tank in response to a first oil pressure lower than a first predetermined pressure level and in response to a second pressure above a different predetermined level, said pressure-responsive valve means being closable in response to a third oil pressure in said oil passage means, higher than said first and lower than said second predetermined pressure levels, all of which pressure levels are generated by said hydraulic pump and applied through said oil passage means.

47. A hydrostatic continuously variable transmission comprising:

a hydraulic pump actuatable by a power source for generating an oil pressure;

a hydraulic motor drivable by the oil pressure generated by said hydraulic pump;

oil passage means for supplying oil from said hydraulic pump to said hydraulic motor; and pressure-responsive valve means connected to said oil passage means for draining the oil from said oil passage means to an oil tank in response to a first oil pressure lower than a first predetermined pressure level, said pressure-responsive valve means draining the oil from said oil passage means in response to a second oil pressure level in said oil passage means, higher than a second predetermined pressure level above said first predetermined pressure level all of which pressures are generated by said hydraulic pump and applied through said oil passage means.

* * * * *